US011114700B2

(12) United States Patent
Park et al.

(10) Patent No.: US 11,114,700 B2
(45) Date of Patent: Sep. 7, 2021

(54) POUCH-SHAPED SECONDARY BATTERY HAVING STRUCTURE IN WHICH BIDIRECTIONAL CELL IS CHANGED TO UNIDIRECTIONAL CELL

(71) Applicant: LG Chem, Ltd., Seoul (KR)

(72) Inventors: Jong Pil Park, Daejeon (KR); Geun Chang Chung, Daejeon (KR); Won Seok Jeong, Daejeon (KR); Yo Han Ko, Daejeon (KR)

(73) Assignee: LG Chem, Ltd.

( * ) Notice: Subject to any disclaimer, the term of this patent is extended or adjusted under 35 U.S.C. 154(b) by 55 days.

(21) Appl. No.: 16/342,069

(22) PCT Filed: Mar. 21, 2018

(86) PCT No.: PCT/KR2018/003281
§ 371 (c)(1),
(2) Date: Apr. 15, 2019

(87) PCT Pub. No.: WO2018/182228
PCT Pub. Date: Oct. 4, 2018

(65) Prior Publication Data
US 2019/0237811 A1   Aug. 1, 2019

(30) Foreign Application Priority Data
Mar. 28, 2017 (KR) .......................... 10-2017-0039261

(51) Int. Cl.
*H01M 10/0585* (2010.01)
*H01M 10/04* (2006.01)
(Continued)

(52) U.S. Cl.
CPC ... *H01M 10/0585* (2013.01); *H01M 10/0413* (2013.01); *H01M 50/172* (2021.01);
(Continued)

(58) Field of Classification Search
CPC .... H01M 10/0585; H01M 2/06; H01M 2/021; H01M 50/54
See application file for complete search history.

(56) References Cited

U.S. PATENT DOCUMENTS 7,733,629 B2   6/2010   Tasaki et al.
7,763,377 B2 * 7/2010   Kozuki ............... H01M 50/538
429/122
(Continued)

FOREIGN PATENT DOCUMENTS

JP    2001325943 A    11/2001
JP    2003297303 A    10/2003
(Continued)

OTHER PUBLICATIONS

International Search Report for PCT/KR2018/003281, dated Jul. 17, 2018.
(Continued)

*Primary Examiner* — Maria Laios
(74) *Attorney, Agent, or Firm* — Lerner, David, Littenberg, Krumholz & Mentlik, LLP

(57) ABSTRACT

Disclosed herein is a pouch-shaped secondary battery configured to have a structure in which a unit cell, including an electrode assembly constituted by a positive electrode and a negative electrode, stacked in the state in which a separator is interposed between the positive electrode and the negative electrode, electrode tabs, and electrode leads, or a cell assembly, including two or more stacked unit cells, is mounted in a pouch-shaped case, wherein the pouch-shaped secondary battery includes a unidirectional structure in which electrode terminals oriented in two directions are changed to electrode terminals oriented in one direction. In the case in which a battery pack is constituted using a bidirectional cell, a large space is required, whereby the
(Continued)

energy density of the battery pack is reduced. The disclosed pouch-shaped secondary battery has the effect of solving the above problem.

14 Claims, 9 Drawing Sheets

(51) Int. Cl.
| | |
|---|---|
| *H01M 50/54* | (2021.01) |
| *H01M 50/172* | (2021.01) |
| *H01M 50/531* | (2021.01) |
| *H01M 50/543* | (2021.01) |
| *H01M 50/557* | (2021.01) |

(52) U.S. Cl.
CPC ......... *H01M 50/531* (2021.01); *H01M 50/54* (2021.01); *H01M 50/543* (2021.01); *H01M 50/557* (2021.01); *H01M 2220/20* (2013.01)

(56) References Cited

U.S. PATENT DOCUMENTS

| | | | |
|---|---|---|---|
| 8,216,708 B2 | 7/2012 | Jang et al. | |
| 8,263,249 B2 | 9/2012 | Yoon | |
| 10,147,911 B2 | 12/2018 | Yoon | |
| 2004/0023108 A1* | 2/2004 | Nakanishi | H01M 2/30 429/178 |
| 2004/0224225 A1* | 11/2004 | Yamashita | H01M 2/0275 429/181 |
| 2007/0020516 A1 | 1/2007 | Yoon | |
| 2008/0070067 A1 | 3/2008 | Jang et al. | |
| 2009/0154064 A1 | 6/2009 | Tasaki et al. | |
| 2010/0255368 A1 | 10/2010 | Park et al. | |
| 2013/0224580 A1* | 8/2013 | Cherng | H01M 2/26 429/211 |
| 2015/0093617 A1* | 4/2015 | Yoon | H01M 4/13 429/94 |
| 2016/0260957 A1* | 9/2016 | Guen | H01M 50/572 |

FOREIGN PATENT DOCUMENTS

| | | |
|---|---|---|
| JP | 2012181922 A | 9/2012 |
| KR | 20070011654 A | 1/2007 |
| KR | 20080025437 A | 3/2008 |
| KR | 20080074239 A | 8/2008 |
| KR | 20120130557 A | 12/2012 |
| KR | 20140041057 A | 4/2014 |
| KR | 20150045930 A | 4/2015 |
| KR | 20160017150 A | 2/2016 |
| KR | 20160017362 A | 2/2016 |
| KR | 20170012971 A | 2/2017 |
| WO | 2013152149 A1 | 10/2013 |

OTHER PUBLICATIONS

Extended European Search Report including Written Opinion for Application EP18777879.0 dated Jan. 2, 2020, 6 pages.

* cited by examiner

[FIG. 1]
--Prior Art--
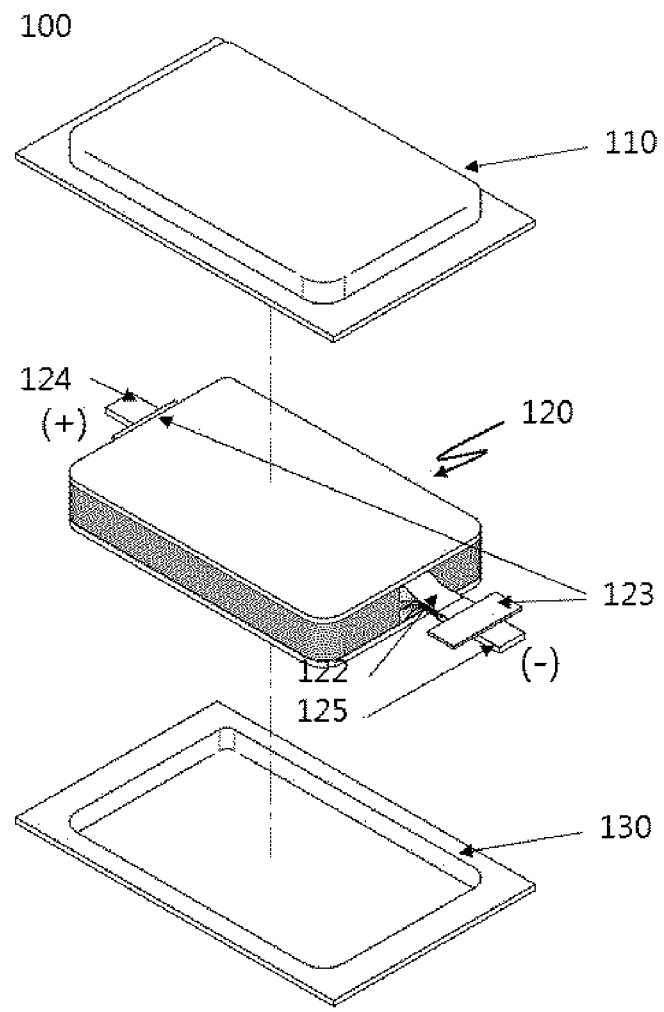

[FIG. 2]
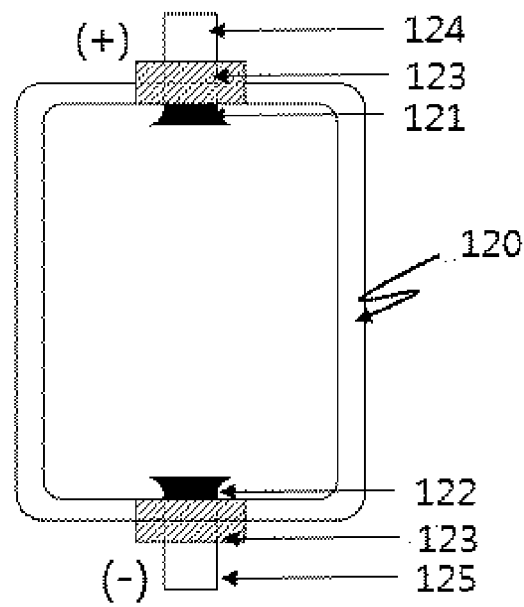
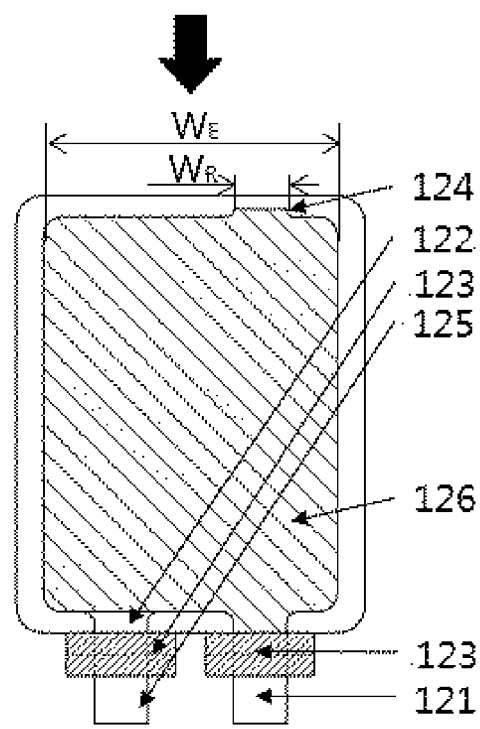

[FIG. 3]
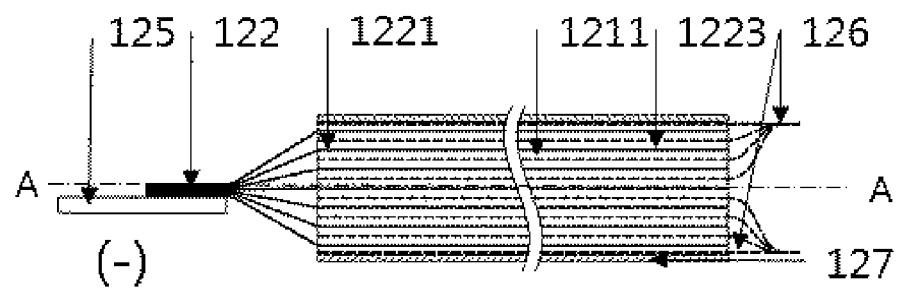
(−) side
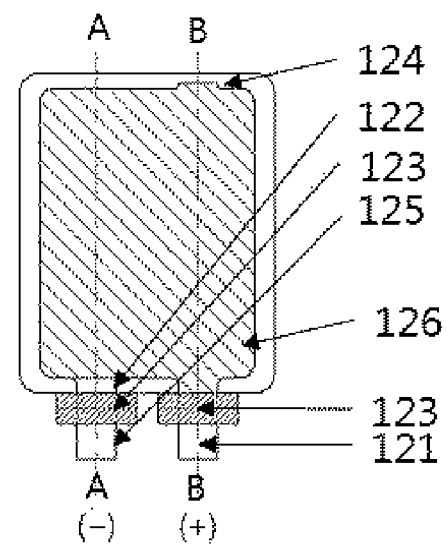
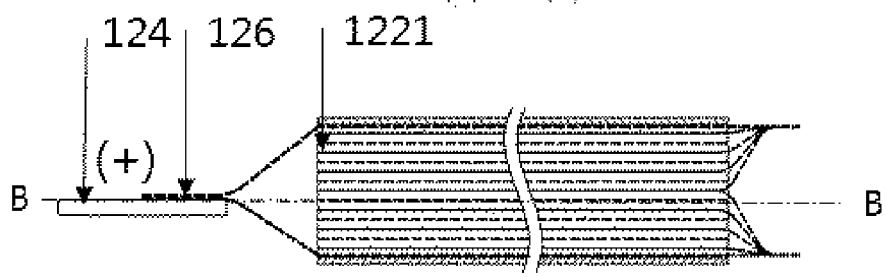
(+) side

[FIG. 4]
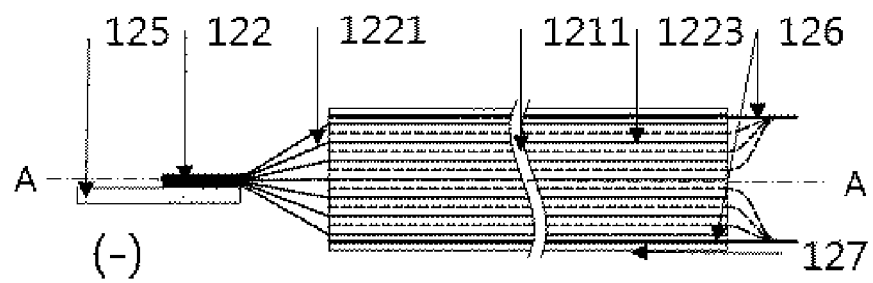
(−) side
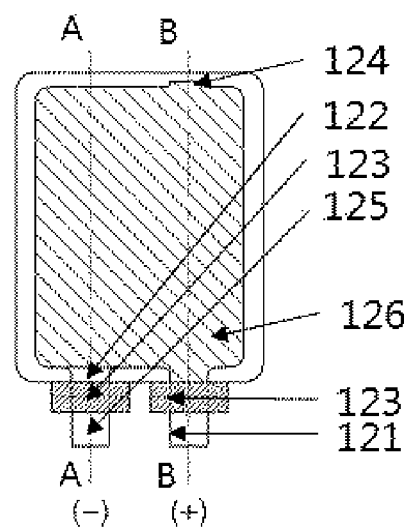
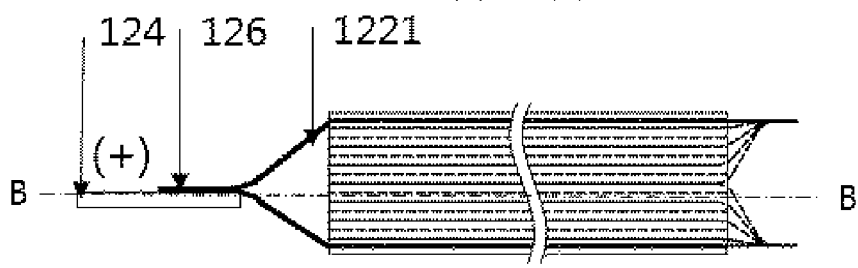
(+) side

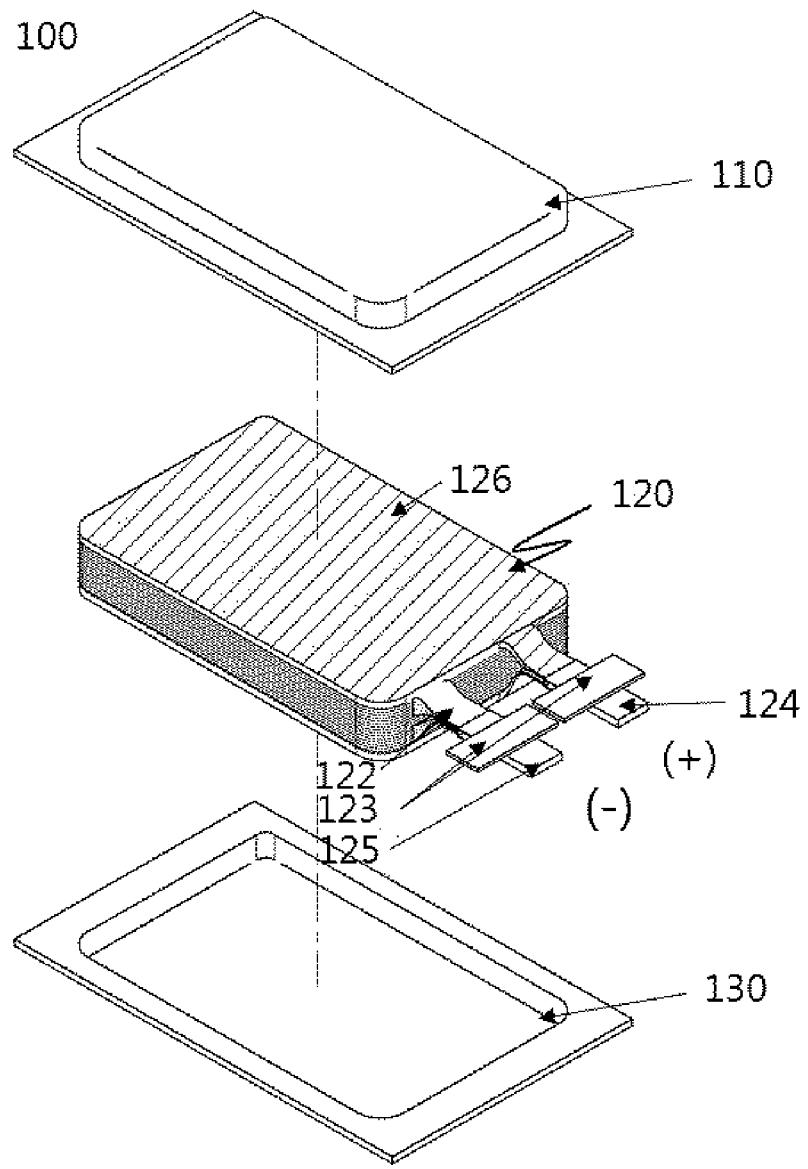
[FIG. 5]

[FIG. 6]
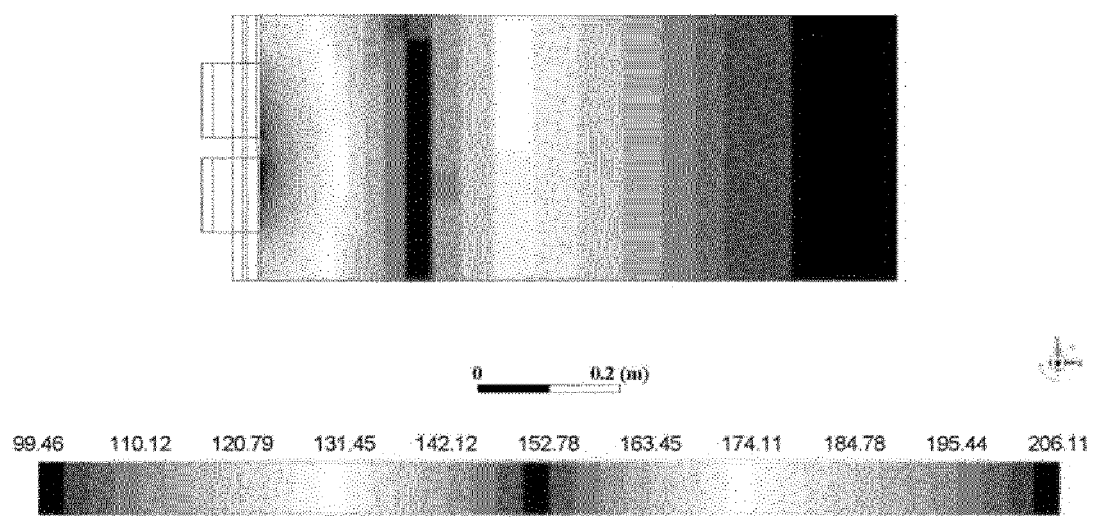

[FIG. 7]
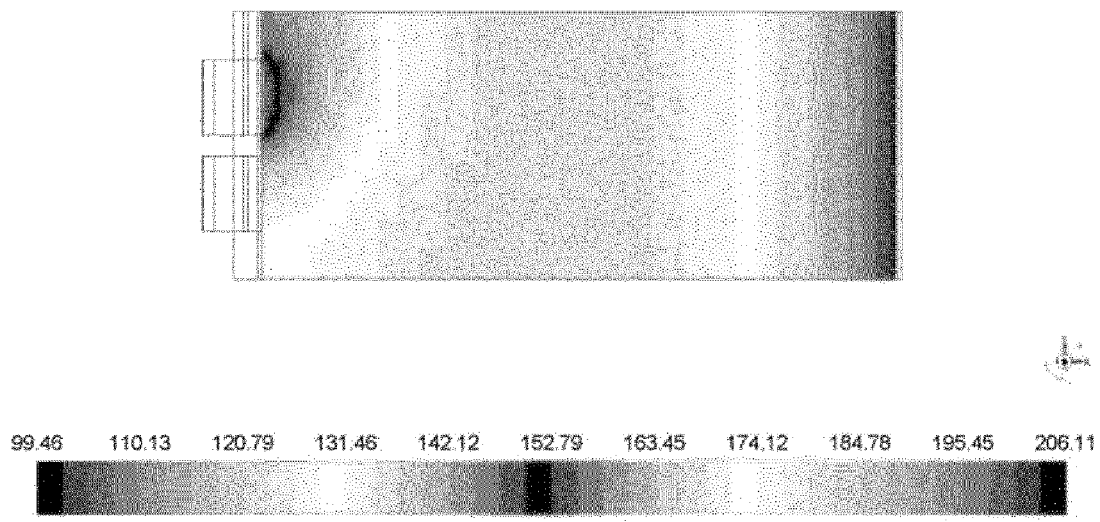

[FIG. 8]
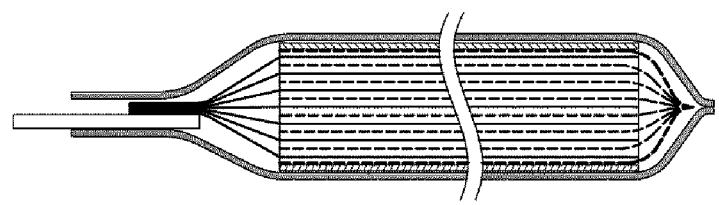
(−) side
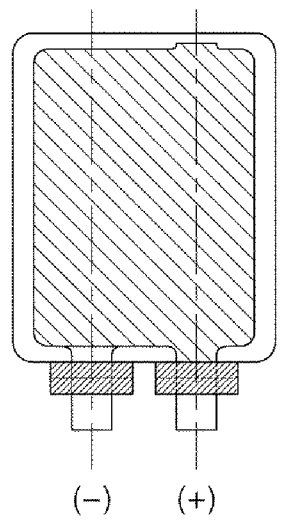
(−)  (+)
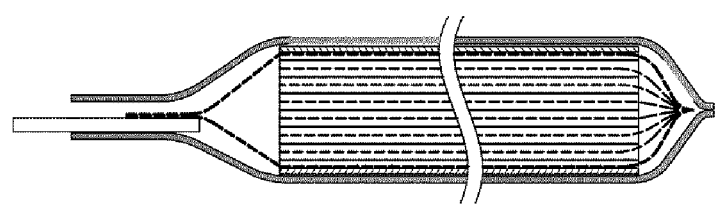
(+) side

[FIG. 9]
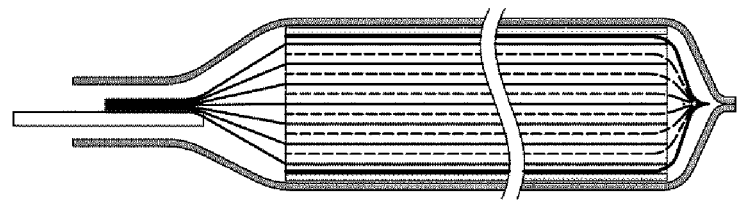
(−) side
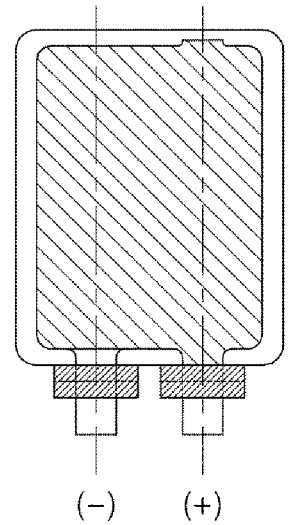
(−)  (+)
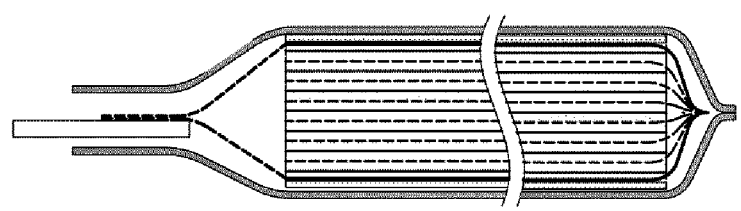
(+) side

POUCH-SHAPED SECONDARY BATTERY HAVING STRUCTURE IN WHICH BIDIRECTIONAL CELL IS CHANGED TO UNIDIRECTIONAL CELL

CROSS-REFERENCE TO RELATED APPLICATIONS

This application is a national phase entry under 35 U.S.C. § 371 of International Application No. PCT/KR2018/003281, filed on Mar. 21, 2018, published in Korean, which claims priority to Korean Patent Application No. 10-2017-0039261, filed on Mar. 28, 2017, the disclosures of which are hereby incorporated herein by reference.

TECHNICAL FIELD

The present invention relates to a pouch-shaped secondary battery having a structure in which a bidirectional cell is changed to a unidirectional cell, and more particularly to a pouch-shaped secondary battery having a structure in which a bidirectional cell is changed to a unidirectional cell in order to resolve an abnormal state of a pouch-shaped battery cell due to nonuniformity of the energy density of the battery cell and/or due to nonuniformity of active materials in the battery cell at the time of charging or discharging the battery cell, whereby the stability of the secondary battery is improved.

BACKGROUND ART

In general, there are various kinds of secondary batteries, such as a nickel cadmium battery, a nickel hydride battery, a lithium ion battery, and a lithium ion polymer battery. Such secondary batteries have been used in large-sized products that require high output, such as an electric vehicle and a hybrid electric vehicle, a power storage apparatus for storing surplus power or new and renewable energy, and a backup power storage apparatus, as well as small-sized products, such as a digital camera, a portable digital versatile disc (DVD) player, an MP3 player, a cellular phone, a personal digital assistant (PDA), a portable game device, a power tool, and an electric bicycle (E-bike).

A lithium secondary battery generally includes a positive electrode (a cathode), a separator, and a negative electrode (an anode). The materials of the positive electrode, the separator, and the negative electrode are selected in consideration of the lifespan, the charge and discharge capacity, the temperature characteristics, and the stability of the battery.

In general, the lithium secondary battery is configured to have a three-layered structure, in which a positive electrode, a separator, and a negative electrode are sequentially stacked. Alternatively, the lithium secondary battery is configured to have a five-layered structure, in which a positive electrode, a separator, a negative electrode, a separator, and a positive electrode are sequentially stacked, or to have another five-layered structure, in which a negative electrode, a separator, a positive electrode, a separator, and a negative electrode are sequentially stacked.

A plurality of unit cells is combined to constitute an electrode assembly or a secondary battery.

Unidirectional electrode terminals of a secondary battery are formed as follows. Positive electrode and negative electrode tabs of an electrode assembly are formed at the same side of the electrode assembly, and then electrode leads are connected to the electrode tabs in order to constitute electrode terminals. A unidirectional cell has a disadvantage in that the lifespan of the cell is reduced due to heat generated from the electrode leads and due to nonuniform use of active materials in the cell at the time of charging and discharging the cell.

Bidirectional electrode terminals are formed as follows. The positive electrode and negative electrode tabs of the electrode assembly are formed at opposite sides of the electrode assembly, and then electrode leads are connected to the electrode tabs in order to constitute electrode terminals.

In the case in which a battery pack is constituted using a bidirectional cell, a larger space is required than in the case in which a battery pack is constituted using a unidirectional cell, whereby the energy density of the battery pack is reduced.

There has not been proposed a pouch-shaped secondary battery having a structure in which a bidirectional cell is changed to a unidirectional cell that is capable of solving the problem occurring in a battery cell including electrode leads formed in one direction, i.e. the problem in that the lifespan of the battery cell is reduced due to heat generated from the electrode leads and due to nonuniform use of active materials in the battery cell at the time of charging and discharging the battery cell, and the problem occurring in a battery cell including electrode leads formed in two directions, i.e. the problem in that a larger space is required at the time of packing than in the case of a unidirectional battery cell, whereby the energy density of the battery cell is reduced, such that the stability and energy density of the secondary battery are improved.

Japanese Patent Application Publication No. 2001-325963 (2001.11.22) discloses a flat battery configured such that one end of a resistor having a positive temperature coefficient is connected to one of a pair of thin terminals extending from a terrace-shaped circumferential sealed portion, wherein the resistor is received in the circumferential sealed portion through an insulating material disposed on the circumferential sealed portion. However, this publication does not disclose a structure corresponding to a pouch-shaped secondary battery configured such that electrode terminals of the secondary battery are formed in two directions and such that the bidirectional electrode terminals are then changed to electrode terminals for a unidirectional battery using a unidirectional structure.

Korean Patent Application Publication No. 2007-0011654 (Jan. 25, 2007) discloses a battery cartridge having two or more unit batteries mounted therein, wherein the battery cartridge is configured to have a structure in which a rotary unit is formed at an overall plate-shaped cartridge case in the vertical direction (the breadth direction) and/or in the horizontal direction (the longitudinal direction) in order to orient the battery cartridge at a predetermined angle in the horizontal direction and/or in the vertical direction. However, this publication does not disclose a structure corresponding to a pouch-shaped secondary battery configured such that electrode terminals of the secondary battery are formed in two directions and such that the bidirectional electrode terminals are changed to electrode terminals for a unidirectional battery using an Al-foil type unidirectional structure.

Korean Patent Application Publication No. 2016-0017362 (Feb. 16, 2016) discloses a lithium polymer secondary battery including a module connection unit connecting secondary battery modules for enabling a change in direction of the secondary battery modules. However, this publication does not disclose a structure corresponding to a pouch-shaped secondary battery configured such that electrode terminals of the secondary battery are formed in two directions and such that the bidirectional electrode terminals are then changed to electrode terminals for a unidirectional battery using a unidirectional structure.

Korean Patent Application Publication No. 2008-0025437 (Mar. 21, 2008) discloses a secondary battery configured such that a member (a safety connection member), which includes a horizontal connection terminal (a) connected to one side of a safety element and a vertical connection terminal (b) connected to the other side of the safety element, is connected to electrode terminals of a battery cell having an electrode assembly of a positive electrode/separator/negative electrode structure mounted in a battery case in a sealed state, whereby external input and output terminals of the battery cell are variably formed by the safety connection member. However, this publication does not disclose a structure corresponding to a pouch-shaped secondary battery configured such that electrode terminals of the secondary battery are formed in two directions and such that the bidirectional electrode terminals are then changed to electrode terminals for a unidirectional battery using a unidirectional structure.

That is, there has not been proposed a pouch-shaped secondary battery having a structure in which a bidirectional cell is changed to a unidirectional cell that is capable of solving the problem occurring in a battery cell including electrode leads formed in one direction, i.e. the problem in that the lifespan of the battery cell is reduced due to heat generated from the electrode leads and due to nonuniform use of active materials in the battery cell at the time of charging and discharging the battery cell, and the problem occurring in a battery cell including electrode leads formed in two directions, i.e. the problem in that a larger space is required at the time of packing than in the case of a unidirectional battery cell, whereby the energy density of the battery cell is reduced, such that the stability and energy density of the secondary battery are improved.

(Patent Document 001) Japanese Patent Application Publication No. 2001-325963 (Nov. 22, 2001)

(Patent Document 002) Korean Patent Application Publication No. 2007-0011654 (Jan. 25, 2007) (Patent Document 003) Korean Patent Application Publication No. 2016-0017362 (Feb. 16, 2016)

(Patent Document 004) Korean Patent Application Publication No. 2008-0025437 (Mar. 21, 2008)

DISCLOSURE

Technical Problem

The present invention has been made in view of the above problems, and it is an object of the present invention to provide a pouch-shaped secondary battery having a structure in which a bidirectional cell is changed to a unidirectional cell that is capable of solving a problem occurring in a battery cell including electrode leads formed in one direction, i.e. a problem in that the lifespan of the battery cell is reduced due to heat generated from the electrode leads and due to nonuniform use of active materials in the battery cell at the time of charging and discharging the battery cell, and a problem occurring in a battery cell including electrode leads formed in two directions, i.e. a problem in that a larger space is required at the time of packing than in the case of a unidirectional battery cell, whereby the energy density of the battery cell is reduced, such that the stability and energy density of the secondary battery are improved.

It is another object of the present invention to provide a pouch-shaped secondary battery including a battery cell having a unidirectional cell structure while exhibiting the characteristics of a bidirectional cell, wherein the secondary battery includes a structure in which uniform degeneration of the battery cell is induced and in which a bidirectional cell is changed to a unidirectional cell such that a battery pack can be assembled using the unidirectional cell.

Technical Solution

In accordance with one aspect of the present invention, the above and other objects can be accomplished by the provision of a pouch-shaped secondary battery configured to have a structure in which a unit cell, including an electrode assembly constituted by a positive electrode and a negative electrode, stacked in the state in which a separator is interposed between the positive electrode and the negative electrode, electrode tabs, and electrode leads, or a cell assembly, including two or more stacked unit cells, is mounted in a pouch-shaped case, wherein the pouch-shaped secondary battery includes a unidirectional structure in which electrode terminals oriented in two directions are changed to electrode terminals oriented in one direction.

The unidirectional structure may be configured such that the electrode tabs are formed at the electrode assembly so as to be oriented in two directions and such that any one of the electrode tabs then extends in one direction in order to constitute an electrode terminal.

The unidirectional structure may be configured such that the electrode tabs are formed at the electrode assembly so as to be oriented in two directions and such that any one of the electrode tabs then extends in one direction so as to be connected to a corresponding one of the electrode leads.

The unidirectional structure may be an electrode and/or metal foil.

The electrode lead may be a positive electrode lead or a negative electrode lead.

The unidirectional structure may be configured to wrap a specific surface of the electrode assembly.

A coating layer may be formed on one surface of the unidirectional structure.

The coating layer may be made of at least one selected from among a thermoplastic resin, a thermosetting resin, and a photo-curing resin, which exhibit high electrical insulation.

The unidirectional structure may have a thickness of 5 to 500μμm.

The unidirectional structure may be platinum (Pt), gold (Au), palladium (Pd), iridium (Ir), silver (Ag), ruthenium (Ru), nickel (Ni), stainless steel (STS), aluminum (Al), copper (Cu), molybdenum (Mo), chrome (Cr), carbon (C), titanium (Ti), tin (Sn), tungsten (W), In-doped $SnO_2$ (ITO), F-doped $SnO_2$ (FTC)), an alloy thereof, or one of aluminum (Al), copper (Cu), and stainless steel, the surface of which is treated with carbon (C), nickel (Ni), titanium (Ti), or silver (Ag).

The unidirectional structure may be a substrate having a metal layer formed on one surface thereof.

The coating layer may be coated with a positive-electrode or negative-electrode active material.

In accordance with another aspect of the present invention, there is provided a device including the pouch-shaped secondary battery.

The device may be selected from the group consisting of an electronic device, an electric vehicle, a hybrid electric vehicle, and a power storage apparatus.

BRIEF DESCRIPTION OF DRAWINGS

The above and other objects, features and other advantages of the present invention will be more clearly understood from the following detailed description taken in conjunction with the accompanying drawings, in which:

FIG. 1 is a view showing an illustrative conventional bidirectional stacked-type pouch-shaped secondary battery;

FIG. 2 is a plan view showing a pouch-shaped secondary battery having a structure in which a bidirectional cell is changed to a unidirectional cell according to an embodiment of the present invention;

FIG. 3 is a sectional view showing the case in which a positive electrode from which electrode tabs diverge is used as a unidirectional structure in the pouch-shaped secondary battery having the structure in which the bidirectional cell is changed to the unidirectional cell according to the embodiment of the present invention;

FIG. 4 is a sectional view showing the case in which metal foil from which electrode tabs diverge is used as the unidirectional structure in the pouch-shaped secondary battery having the structure in which the bidirectional cell is changed to the unidirectional cell according to the embodiment of the present invention;

FIG. 5 is a view showing the pouch-shaped secondary battery having the structure in which the bidirectional cell is changed to the unidirectional cell according to the embodiment of the present invention;

FIG. 6 is a view showing the result of a transfer current density (TCD) test performed on an illustrative conventional unidirectional stacked-type pouch-shaped secondary battery;

FIG. 7 is a view showing the result of a transfer current density (TCD) test performed on the pouch-shaped secondary battery having the structure in which the bidirectional cell is changed to the unidirectional cell according to the embodiment of the present invention;

FIG. 8 is a sectional view showing the case in which a positive electrode to which electrode tabs converge is used as the unidirectional structure in the pouch-shaped secondary battery having the structure in which the bidirectional cell is changed to the unidirectional cell according to the embodiment of the present invention; and FIG. 9 is a sectional view showing the case in which metal foil to which electrode tabs converge is used as the unidirectional structure in the pouch-shaped secondary battery having the structure in which the bidirectional cell is changed to the unidirectional cell according to the embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

Comparative Example

FIG. 1 is a view showing an illustrative conventional bidirectional stacked-type pouch-shaped secondary battery.

In general, a lithium secondary battery is manufactured as follows. First, a mixture of an active material, a binder, and a plasticizer is applied to a positive electrode current collector and to a negative electrode current collector in order to manufacture a positive electrode plate and a negative electrode plate, respectively. Subsequently, a plurality of positive electrode plates and a plurality of negative electrode plates are stacked in the state in which separators are interposed respectively between the positive electrode plates and the negative electrode plates in order to manufacture a battery cell having a predetermined shape. Subsequently, the battery cell is placed in a battery case, an electrolytic solution is injected into the battery case, and the battery case is sealed, whereby a battery pack is manufactured.

Electrode leads are connected to a general electrode assembly. Each of the electrode leads is configured to have a structure in which one end of the electrode lead is connected to the electrode assembly, the other end of the electrode lead is exposed outside of the battery case, and the battery case, in which the electrode assembly is placed, is sealed by an adhesive layer, such as a sealant layer, at the portion of the battery case from which the electrode lead extends outwards from the battery case.

The electrode assembly is provided with electrode tabs. Each current collector plate of the electrode assembly includes a coated part, on which an electrode active material is coated, and an end part (hereinafter, referred to as a "non-coated part"), on which the electrode active material is not coated. Each of the electrode tabs may be formed by cutting the non-coated part, or may be a separate conductive member connected to the non-coated part by ultrasonic welding. As shown, the electrode tabs may protrude in one direction such that the electrode tabs are formed at the electrode assembly so as to be arranged side by side. Alternatively, the electrode tabs may protrude in two directions.

Each electrode tab serves as a path along which electrons move between the inside and the outside of the battery. Each of the electrode leads is connected to a corresponding one of the electrode tabs by spot welding. The electrode leads may extend in one direction or in two directions depending on the position at which positive electrode tabs and negative electrode tabs are formed. A positive electrode lead and a negative electrode lead may be made of different materials. For example, the positive electrode lead may be made of the same material as the positive electrode plate, such as an aluminum (Al) material, and the negative electrode lead may be made of the same material as the negative electrode plate, such as a copper (Cu) material or a copper material coated with nickel (Ni). Finally, the electrode leads are electrically connected to external terminals via terminal parts thereof.

A pouch sheathing member receives the electrode assembly in a sealed state such that a portion of each of the electrode leads, i.e. the terminal part of each of the electrode leads, is exposed from the pouch sheathing member. An adhesive layer, such as a sealant layer, which was described previously, is interposed between each of the electrode leads and the pouch sheathing member. The pouch sheathing member is provided at the edge thereof with a sealed region. A horizontal slit in each of the electrode leads is spaced apart from the sealed region toward a joint. That is, in the case in which each of the electrode leads is formed so as to have an inverted T shape, the leg part of the T shape protrudes outwards from the pouch sheathing member, whereas a portion of the head part of the T shape is located in the sealed region.

In general, a positive electrode current collector plate is made of an aluminum material, and a negative electrode current collector plate is made of a copper material. When a swelling phenomenon occurs, copper foil tends to rupture more easily than aluminum foil. For this reason, the negative electrode lead may rupture more easily than the positive electrode lead. Preferably, therefore, an electrode lead capable of easily rupturing is used as the negative electrode lead.

Unidirectional electrode terminals are formed as follows. The positive electrode and negative electrode tabs of the electrode assembly are formed at the same side of the electrode assembly, and then electrode leads are connected to the electrode tabs in order to constitute the electrode terminals.

A unidirectional cell has a disadvantage in that the lifespan of the cell is reduced due to heat generated from the electrode leads and due to nonuniform use of active materials in the cell at the time of charging and discharging the cell.

Bidirectional electrode terminals are formed as follows. The positive electrode and negative electrode tabs of the electrode assembly are formed at opposite sides of the electrode assembly, and then electrode leads are connected to the electrode tabs in order to constitute the electrode terminals.

In the case in which a battery pack is constituted using a bidirectional cell, a larger space is required than in the case in which a battery pack is constituted using the unidirectional cell, whereby the energy density of the battery pack is reduced.

FIG. 2 is a plan view showing a pouch-shaped secondary battery having a structure in which a bidirectional cell is changed to a unidirectional cell according to an embodiment of the present invention.

In order to change the bidirectional cell to the unidirectional cell, the electrode lead may be formed, as shown in the lower part of FIG. 2. The width WR of the electrode lead is not limited. The width of the electrode lead may be increased up to the width WE of the electrode assembly. Resistance may be reduced and heat dissipation efficiency may be improved in proportion to the increase in the width of the electrode lead. The ratio of the width WR of the electrode lead to the width WE of the electrode assembly may range from 0.1 to 1.

A pouch-shaped case includes a gas barrier layer and a sealant layer. The pouch-shaped case may further include a surface protective layer, which is the outermost layer formed on the gas barrier layer. The gas barrier layer is configured to prevent the introduction of gas into the battery cell. The gas barrier layer is mainly made of aluminum (Al) foil. The sealant layer is the innermost layer of the pouch-shaped case, which contacts the member placed in the pouch-shaped case, i.e. a cell. The surface protective layer is mainly made of a nylon resin in consideration of wear resistance and heat resistance. The pouch-shaped case is manufactured by processing a film having the above-described stack structure into the shape of a pouch. Components constituting the cell, such as positive electrodes, negative electrodes, and separators, are placed in the pouch-shaped case in the state of being impregnated with an electrolytic solution. After the components constituting the cell are placed in the pouch-shaped case, the sealant layers are sealed by thermal bonding at the entrance to the pouch-shaped case. Since each of the sealant layers contacts the components constituting the cell, it is necessary for each of the sealant layers to exhibit high insulation and strong resistance to the electrolytic solution. In addition, it is necessary for each of the sealant layers to exhibit high sealability to such an extent that the pouch-shaped case can be isolated from the outside. That is, it is necessary for the sealing portion of the pouch-shaped case at which the sealant layers are sealed by thermal bonding to exhibit high thermal adhesive strength. In general, a sealant layer is made of a polyolefin-based resin, such as polypropylene (PP) or polyethylene (PE). In particular, each of the sealant layers of the pouch-shaped case is mainly made of polypropylene (PP), since polypropylene exhibits excellent mechanical properties, such as high tensile strength, high rigidity, high surface hardness, and high impact resistance, as well as strong resistance to an electrolytic solution.

The structure of a pouch-shaped secondary battery having a structure in which a bidirectional battery cell is changed to a unidirectional battery cell is similar to the structure of the unidirectional battery cell. In the pouch-shaped secondary battery having the structure in which the bidirectional battery cell is changed to the unidirectional battery cell, however, positive electrodes are pre-welded at the position of the bidirectional battery cell at which the positive electrodes are located, and are then connected to electrodes oriented in the opposite direction.

The present invention provides a pouch-shaped secondary battery configured to have a structure in which a unit cell, including an electrode assembly constituted by a positive electrode and a negative electrode, stacked in the state in which a separator is interposed between the positive electrode and the negative electrode, electrode tabs, and electrode leads, or a cell assembly, including two or more stacked unit cells, is mounted in a pouch-shaped case, wherein the pouch-shaped secondary battery includes a unidirectional structure in which electrode terminals oriented in two directions are changed to electrode terminals oriented in one direction.

FIG. 3 is a sectional view showing the case in which a positive electrode from which electrode tabs diverge is used as a unidirectional structure in the pouch-shaped secondary battery having the structure in which the bidirectional cell is changed to the unidirectional cell according to the embodiment of the present invention.

FIG. 4 is a sectional view showing the case in which metal foil from which electrode tabs diverge is used as the unidirectional structure in the pouch-shaped secondary battery having the structure in which the bidirectional cell is changed to the unidirectional cell according to the embodiment of the present invention.

FIG. 8 is a sectional view showing the case in which a positive electrode to which electrode tabs converge is used as the unidirectional structure in the pouch-shaped secondary battery having the structure in which the bidirectional cell is changed to the unidirectional cell according to the embodiment of the present invention.

FIG. 9 is a sectional view showing the case in which metal foil to which electrode tabs converge is used as the unidirectional structure in the pouch-shaped secondary battery having the structure in which the bidirectional cell is changed to the unidirectional cell according to the embodiment of the present invention.

A negative electrode is pre-welded to electrode tabs extending from all bicells. A positive electrode is pre-welded to two electrode tabs connected via the outermost electrodes or foil connected in the direction opposite the negative electrode. The surface of the portion of the battery cell to which the positive electrode is connected may be coated so as to be used as an electrode, and may constitute the outermost part of the folded battery cell. Alternatively, the portion of the battery cell may be made of metal foil, such as aluminum foil, and may be located at the edge of the folded battery cell.

In the unidirectional structure, electrode tabs may be formed at the electrode assembly in two directions, and one of the electrode tabs may extend in one direction in order to constitute an electrode terminal.

In this case, no electrode lead may be connected to the electrode terminal.

The pouch-shaped secondary battery may further include an insulating tape. The insulating tape is attached to a predetermined portion of the pouch-shaped case at which the electrode tab contacts the pouch-shaped case in order to seal the pouch-shaped case while insulating the electrode tab from the pouch-shaped case. When the pouch-shaped case is sealed, the pressure at the portion of the pouch-shaped case at which the electrode tab contacts the pouch-shaped case is relatively high. As a result, a casted polypropylene (CPP) layer of the pouch-shaped case may be easily damaged. Consequently, an inner layer of the insulating tape exhibits high mechanical strength and high heat resistance such that the shape of the insulating tape can be maintained, and thus electrical insulation between the pouch-shaped case and the electrode tab can be maintained when the pouch-shaped case is sealed by fusion in the state in which heat and pressure are applied to the pouch-shaped case. In particular, the inner layer of the insulating tape prevents aluminum foil of the pouch-shaped case from electrically contacting the electrode tab even when a portion of the aluminum foil of the pouch-shaped case is exposed during the sealing of the pouch-shaped case, whereby it is possible to maintain the insulated state of the pouch-shaped case. An outer layer of the insulating tape provides high adhesive force between the pouch-shaped case and the electrode tab even when a portion of the insulating tape is deformed in the state in which heat and pressure are applied to the pouch-shaped case, whereby it is possible to maintain the sealed state of the pouch-shaped case. Therefore, even when the casted polypropylene (CPP) layer of the pouch-shaped case is deformed due to heat and pressure during the sealing of the pouch-shaped case, whereby a portion of the aluminum foil of the pouch-shaped case is exposed, it is possible to maintain the insulated state of the pouch-shaped case.

Alternatively, in the unidirectional structure, electrode tabs may be formed at the electrode assembly in two directions, and one of the electrode tabs may extend in one direction so as to be connected to a corresponding electrode lead.

The unidirectional structure may be an electrode and/or a metal.

The electrode lead may be a positive electrode lead or a negative electrode lead.

The unidirectional structure may be configured to wrap a specific surface of the electrode assembly.

A coating layer may be formed on one surface of the unidirectional structure.

The coating layer may be made of at least one selected from among a thermoplastic resin, a thermosetting resin, and a photo-curing resin, which exhibit high electrical insulation.

A thermoplastic, thermosetting, or photo-curing resin, which exhibits high electrical insulation, may be used as the polymer resin. For example, any one selected from among a styrene-butadiene resin, a styrene resin, an epoxy resin, a urethane resin, an acrylic-based resin, a phenol resin, an amide-based resin, an acrylate-based resin, and a denatured resin thereof may be used. Two or more kinds of resins may be used in a mixed state as needed. Among the polymer resins, the thermoplastic resin may be an elastomer, which serves as a matrix to support the formation of a film. The thermoplastic resin may have a softening point of about 100 to 1800° C. The thermoplastic resin may account for 20 to 80 volume % of the total volume % of the polymer resin.

The polymer resin may be a thermosetting polymer resin, which may include at least one selected from among an acrylic resin, an epoxy resin, an ethylene propylene diene monomer (EPDM) resin, a chlorinated polyethylene (CPE) resin, silicone, polyurethane, a urea resin, a melamine resin, a phenol resin, and an unsaturated ester resin.

Preferably, an acrylic resin is used as the thermosetting polymer resin.

The polymer resin may include at least one selected from among an acrylic resin, an epoxy resin, an ethylene propylene diene monomer (EPDM) resin, a chlorinated polyethylene (CPE) resin, silicone, polyurethane, a urea resin, a melamine resin, a phenol resin, and an unsaturated ester resin.

The coating layer may have a thickness of 10 to 50μμm, preferably 15 to 30μμm. If the thickness of the coating layer deviates from the above range, it is not possible to exhibit normal insulation performance.

The unidirectional structure may have a thickness of 5 to 500μμm.

The unidirectional structure may have a thickness of 10 to 500μμm, preferably 15 to 300μμm. If the thickness of the unidirectional structure deviates from the above range, conduction performance, heat dissipation efficiency, and energy density may be affected.

The unidirectional structure may be a metal, such as gold, silver, copper, aluminum, or an alloy thereof.

The unidirectional structure may be a substrate having a metal layer formed on one surface thereof.

The coating layer may be coated with a positive-electrode or negative-electrode active material.

One surface of the coating layer may be coated with a positive-electrode or negative-electrode active material, and the other surface of the coating layer may be coated with a polymer or a nonconductive material. It is obvious that a film may be used instead of the coating layer.

At least one lithium-containing metal oxide, selected from the group of a lithium cobalt oxide, a lithium nickel oxide, a lithium manganese oxide, a lithium cobalt-nickel oxide, a lithium cobalt-manganese oxide, a lithium manganese-nickel oxide, a lithium cobalt-nickel-manganese oxide, a lithium iron phosphate oxide having an olivine structure, and a lithium manganese oxide having a spinel structure, and an oxide obtained by replacing at least one of the above-specified elements with another element(s) different from the above-specified elements or doping another element(s) different from the above-specified elements may be used as the positive electrode active material. Here, the another element(s) may be at least one selected from the group consisting of Al, Mg, Mn, Ni, Co, Cr, V, and Fe.

A lithium metal, a lithium alloy (for example, an alloy of lithium and metal, such as aluminum, zinc, bismuth, cadmium, antimony, silicon, lead, tin, gallium, or indium), amorphous carbon, crystalline carbon, carbon composite, or $SnO_2$ may be used as the negative electrode active material. However, the present invention is not limited thereto.

The substrate may be at least one selected from among a glass substrate, a resin substrate, and a metal substrate.

A metal precursor for forming the metal layer of the unidirectional structure may be gold (Au), platinum (Pt), silver (Ag), copper (Cu), aluminum (Al), lithium (Li), sodium (Na), potassium (K), rubidium (Rb), cesium (Cs), beryllium (Be), magnesium (Mg), Calcium (Ca), or a combination thereof.

A catalyst for the metal precursor may be at least one selected from among titanium isopropoxide ($Ti(O-i-Pr)_4$), titanium chloride ($TiCl_4$), a platinum (Pt)-based catalyst, a cobalt (Co)-based catalyst, a nickel (Ni)-based catalyst, a manganese (Mg)-based catalyst, and a zinc (Zn)-based catalyst.

The metal precursor may be metal hydride, a composite of metal hydride and an ether- or amine-based material, or a combination thereof.

The metal precursor may be $AlH_3$, $LiH$, $NaH$, $KH$, $RbH$, $CsH$, $BeH_2$, $MgH_2$, $CaH_2$, $SrH_2$, $OAlH_3$ $(C_2H_5)_2$, $OAlH_3$ $(C_3H_7)_2$, $OAlH_3$ $(C_4H_9)_2$, $AlH_3\cdot\cdot NMe_3$, $AlH_3\cdot\cdot NEt_3$, $AlH_3\cdot\cdot NEt_2Me$, $AlH_3\cdot\cdot NMe_2Et$, $AlH_3\cdot\cdot dioxane$, $AlH_3\{S(C_2H_5)_2\}$, $AlH_3\{S(C_4H_9)_2\}$, $AlH_3\{S(C_4H_9)_2\}$, $AlH_3C_9H_{12}$, $OLiH(C_2H_5)_2$, $OLiH(C_3H_7)_2$, $OLiH(C_4H_9)_2$, $LiH\cdot\cdot NMe_3$, $LiH\cdot\cdot NEt_3$, $LiH\cdot\cdot NEt_2Me$, $LiH\cdot\cdot NMe_2Et$, $LiH\cdot\cdot dioxane$, $LiH\{S(C_2H_5)_2\}$, $LiH\{S(C_4H_9)_2\}$, $LiH\{S(C_4H_9)_2\}$, $LiHC_9H_{12}$, $ONaH(C_2H_5)_2$, $ONaH(C_3H_7)_2$, $ONaH(C_4H_9)_2$, $NaH\cdot\cdot NMe_3$, $NaH\cdot\cdot NEt_3$, $NaH\cdot\cdot NEt_2Me$, $NaH\cdot\cdot NMe_2Et$, $NaH\cdot\cdot dioxane$, $NaH\{S(C_2H_5)_2\}$, $NaH\{S(C_4H_9)_2\}$, $NaH\{S(C_4H_9)_2\}$, $NaHC_9H_{12}$, $OKH(C_2H_5)_2$, $OKH(C_3H_7)_2$, $OKH(C_4H_9)_2$, $KH\cdot\cdot NMe_3$, $KH\cdot\cdot NEt_3$, $KH\cdot\cdot NEt_2Me$, $KH\cdot\cdot NMe_2Et$, $KH\cdot\cdot dioxane$, $KH\{S(C_2H_5)_2\}$, $KH\{S(C_4H_9)_2\}$, $KH\{S(C_4H_9)_2\}$, $KHC_9H_{12}$, $ORbH(C_2H_5)_2$, $ORbH(C_3H_7)_2$, $ORbH(C_4H_9)_2$, $RbH\cdot\cdot NMe_3$, $RbH\cdot\cdot NEt_3$, $RbH\cdot\cdot NEt_2Me$, $RbH\cdot\cdot NMe_2Et$, $RbH\cdot\cdot dioxane$, $RbH\{S(C_2H_5)_2\}$, $RbH\{S(C_4H_9)_2\}$, $RbH\{S(C_4H_9)_2\}$, $RbHC_9H_{12}$, $OCsH(C_2H_5)_2$, $OCsH(C_3H_7)_2$, $OCsH(C_4H_9)_2$, $CsH\cdot\cdot NMe_3$, $CsH\cdot\cdot NEt_3$, $CsH\cdot\cdot NEt_2Me$, $CsH\cdot\cdot NMe_2Et$, $CsH\cdot\cdot dioxane$, $CsH\{S(C_2H_5)_2\}$, $CsH\{S(C_4H_9)_2\}$, $CsH\{S(C_4H_9)_2\}$, $Cs HC_9H_{12}$, $OBeH_2$ $(C_2H_5)_2$, $OBeH_2(C_3H_7)_2$, $OBeH_2(C_4H_9)_2$, $BeH_2\cdot\cdot NMe_3$, $BeH_2\cdot\cdot NEt_3$, $BeH_2\cdot\cdot NEt_2Me$, $BeH_2\cdot\cdot NMe_2Et$, $BeH_2\cdot\cdot dioxane$, $BeH_2\{S C_2H_5)_2\}$, $BeH_2\{S(C_4H_9)_2\}$, $BeH_2\{S(C_4H_9)_2\}$, Be $HC_9H_{12}$, $OMgH_2$ $(C_2H_5)_2$, $OMgH_2$ $(C_3H_7)_2$, $OMgH_2$ $(C_4H_9)_2$, $MgH_2\cdot\cdot NMe_3$, $MgH_2\cdot\cdot NEt_3$, $MgH_2\cdot\cdot NEt_2Me$, $MgH_2\cdot\cdot NMe_2Et$, $MgH_2\cdot\cdot dioxane$, $MgH_2\{S(C_2H_5)_2\}$, $MgH_2\{S(C_4H_9)_2\}$, $MgH_2\{S(C_4H_9)_2\}$, Mg $HC_9H_{12}$, $OCaH_2(C_2H_5)_2$, $OCaH_2 (C_3H_7)_2$, $OCaH_2$ $(C_4H_9)_2$, $CaH_2\cdot\cdot NMe_3$, $CaH_2\cdot\cdot NEt_3$, $CaH_2\cdot\cdot NEt_2Me$, $CaH_2\cdot\cdot NMe_2Et$, $CaH_2\cdot\cdot dioxane$, $CaH_2\{S(C_2H_5)_2\}$, $CaH_2\{S(C_4H_9)_2\}$, $CaH_2\{S(C_4H_9)_2\}$, $CaHC_9H_{12}$, $OSrH_2$ $(C_2H_5)_2$, $OSrH_2$ $(C_3H_7)_2$, $OSrH_2(C_4H_9)_2$, $SrH_2\cdot\cdot NMe_3$, $SrH_2\cdot\cdot NEt_3$, $SrH_2\cdot\cdot NEt_2Me$, $SrH_2\cdot\cdot NMe_2Et$, $SrH_2\cdot\cdot dioxane$, $SrH_2\{S(C_2H_5)_2\}$, $SrH_2\{S(C_4H_9)_2\}$, $SrH_2\{S(C_4H_9)_2\}$, $SrH_2C_9H_{12}$, or a combination thereof.

In the foil connection structure described above, it is obvious that the foil may be formed on one or both of the upper and lower sides of the battery cell.

In addition, the present invention may provide a device including a pouch-shaped secondary battery.

Here, the device may be selected from the group consisting of an electronic device, an electric vehicle, a hybrid electric vehicle, and a power storage apparatus.

FIG. 6 is a view showing the result of a transfer current density (TCD) test performed on an illustrative conventional unidirectional stacked-type pouch-shaped secondary battery.

It can be seen that the TCD of the conventional unidirectional stacked-type pouch-shaped secondary battery is nonuniformly generated at the side of the battery at which electrode terminals are formed.

FIG. 7 is a view showing the result of a transfer current density (TCD) test performed on the pouch-shaped secondary battery having the structure in which the bidirectional cell is changed to the unidirectional cell according to the embodiment of the present invention.

It can be seen that the TCD of the pouch-shaped secondary battery having the structure in which the bidirectional cell is changed to the unidirectional cell is uniformly generated throughout the battery cell.

Although the present invention has been described in detail with reference to the illustrated embodiments, it will be apparent to those skilled in the art that various substitutions, additions, and modifications can be made, without departing from the technical idea of the invention described above. Thus, it is intended that the present invention cover such modified embodiments, provided they come within the scope of the appended claims.

INDUSTRIAL APPLICABILITY

In the case in which a battery pack is constituted using a bidirectional cell, a large space is required, whereby the energy density of the battery pack is reduced. A pouch-shaped secondary battery having a structure in which a bidirectional cell is changed to a unidirectional cell according to the present invention has the effect of solving the above problem.

The lifespan of a unidirectional cell is reduced due to heat generated from electrode leads and due to nonuniform use of active materials in the cell at the time of charging and discharging the cell. The present invention has the effect of solving the above problem.

In addition, the present invention has the effect of inducing uniform degeneration of a battery cell.

In addition, the present invention has the effect of packing the battery cell in a unidirectional cell structure while exhibiting the characteristics of a bidirectional cell.

ELEMENT LIST

100: Battery cell; 110: Upper pouch; 120: Electrode assembly; 121: Positive electrode tab; 1211: Positive electrode; 122: Negative electrode tab; 1221: Negative electrode; 1223: Separator; 123: Insulating tape; 124: Positive electrode lead; 125: Negative electrode lead; 126: Unidirectional structure; 127: Coating layer; 130: Lower pouch.

The invention claimed is:

1. A pouch-shaped secondary battery comprising a unit cell assembly received within a pouch sheathing member, the unit cell assembly comprising:
   two or more stacked bicells, each bicell including an electrode assembly including a first electrode and a second electrode stacked in a state in which a separator is interposed between the first electrode and the second electrode, a first electrode tab and a second electrode tab protruding from the respective first electrode and second electrode at opposite sides of the electrode assembly, the first electrode tab and the second electrode tab joined to respective first and second electrode leads;

first and second unidirectional structures, the first unidirectional structure having a planar surface thereof disposed adjacent a first planar surface of the pouch sheathing member, the second unidirectional structure having a planar surface thereof disposed adjacent a second planar surface of the pouch sheathing member opposite the first planar surface, the two or more stacked bicells each being disposed between the first and second unidirectional structures, each of the first and second unidirectional structures having respective first and second opposite ends, the first end of each of the first and second unidirectional structures joined to the first electrode lead of each of the two or more stacked bicells, the second end of each of the first and second unidirectional structures extending in a direction toward the second electrode lead of each of the two or more stacked bicells; and first and second electrode terminals exposed to an outside of the pouch sheathing member and extending from a single common side of the pouch sheathing member, the first electrode terminal being or extending from the second end of the each of the first and second unidirectional structures, and the second electrode terminal being or extending from an end of the second electrode lead of each of the two or more stacked bicells, wherein the first electrode terminal and the second electrode terminal have different polarities.

2. The pouch-shaped secondary battery according to claim 1, wherein of the second electrode tab forms a portion of the second electrode terminal.

3. The pouch-shaped secondary battery according to claim 1, wherein the first electrode tab is connected to the first electrode terminal through the unidirectional structure.

4. The pouch-shaped secondary battery according to claim 3, wherein the first electrode terminal is a positive electrode terminal.

5. The pouch-shaped secondary battery according to claim 1, wherein the unidirectional structure is an electrode and/or metal foil.

6. The pouch-shaped secondary battery according to claim 1, wherein the unidirectional structure is configured to wrap the surface of the electrode assembly.

7. The pouch-shaped secondary battery according to claim 1, wherein a coating layer is formed on one surface of the unidirectional structure.

8. The pouch-shaped secondary battery according to claim 7, wherein the coating layer is made of at least one selected from among a thermoplastic resin, a thermosetting resin, and a photo-curing resin, which exhibit electrical insulation.

9. The pouch-shaped secondary battery according to claim 7, wherein the coating layer is coated with a positive-electrode or negative-electrode active material.

10. The pouch-shaped secondary battery according to claim 1, wherein the unidirectional structure has a thickness of 5 to 500 μm.

11. The pouch-shaped secondary battery according to claim 1, wherein the unidirectional structure is platinum (Pt), gold (Au), palladium (Pd), iridium (Ir), silver (Ag), ruthenium (Ru), nickel (Ni), stainless steel (STS), aluminum (Al), copper (Cu), molybdenum (Mo), chrome (Cr), carbon (C), titanium (Ti), tin (Sn), tungsten (W), In-doped $SnO_2$ (ITO), F-doped $SnO_2$ (FTO), an alloy thereof, or one of aluminum (Al), copper (Cu), and stainless steel, a surface of which is treated with carbon (C), nickel (Ni), titanium (Ti), or silver (Ag).

12. The pouch-shaped secondary battery according to claim 1, wherein the unidirectional structure is a substrate having a metal layer formed on one surface thereof.

13. A device comprising the pouch-shaped secondary battery according to claim 1.

14. The device according to claim 13, wherein the device is selected from a group consisting of an electronic device, an electric vehicle, a hybrid electric vehicle, and a power storage apparatus.

* * * * *